(12) United States Patent
Woodhouse

(10) Patent No.: US 8,392,813 B2
(45) Date of Patent: Mar. 5, 2013

(54) REDUNDANT FILE SYSTEM

(75) Inventor: David Woodhouse, Braintree (GB)

(73) Assignee: Intel Corporation, Santa Clara, CA (US)

(*) Notice: Subject to any disclaimer, the term of this patent is extended or adjusted under 35 U.S.C. 154(b) by 468 days.

(21) Appl. No.: 12/644,217

(22) Filed: Dec. 22, 2009

(65) Prior Publication Data

US 2011/0154105 A1    Jun. 23, 2011

(51) Int. Cl.
*G06F 11/00* (2006.01)
(52) U.S. Cl. ........ 714/800; 714/801; 714/758; 714/6.24
(58) Field of Classification Search .................. None
See application file for complete search history.

(56) References Cited

U.S. PATENT DOCUMENTS

| | | | | |
|---|---|---|---|---|
| 5,497,457 | A * | 3/1996 | Ford | 714/6.24 |
| 5,831,393 | A * | 11/1998 | Hohenstein et al. | 714/52 |
| 7,146,461 | B1 * | 12/2006 | Kiselev et al. | 711/114 |
| 8,103,904 | B2 * | 1/2012 | Hafner et al. | 714/6.24 |
| 2005/0097270 | A1 * | 5/2005 | Kleiman et al. | 711/114 |
| 2009/0177917 | A1 * | 7/2009 | Tamura et al. | 714/6 |

* cited by examiner

*Primary Examiner* — Christopher McCarthy
(74) *Attorney, Agent, or Firm* — Trop, Pruner & Hu, P.C.

(57) ABSTRACT

Some embodiments of the invention shift the responsibility for creating parity and error correction blocks from the hardware or software RAID units or modules to the computer system's file system, allowing the file system's existing mechanisms of write atomicity to be used to help ensure consistency of the on-disk information throughout all or increasing portions of the information saving and/or updating cycle.

19 Claims, 6 Drawing Sheets

REDUNDANT FILE SYSTEM

BACKGROUND

RAID (Redundant array of Inexpensive Disks) is a technology which improves the reliability of disk storage by storing redundant data to cope with single or multiple disk failures. One type of RAID, known as RAID-1 or "mirroring", involves using a pair of disks and writing the same data to each disk. In the event of a failure of one of the disks, data can be recovered from the other disk. The RAID-1 approach is relatively inefficient in terms of capacity because only half of the total disk capacity is available for use.

RAID-4 uses a set of N disks, one of which is used solely to store "parity" information. Parity information includes, for example, redundancy information. Parity information or data may refer not only to actual bit-parity blocks, such as (P) blocks, but also to other redundancy information such as error correction syndromes (Q) blocks. In a RAID-4 system with five disks, the fifth disk will be used for parity and its first block will contain the exclusive-or of the contents of the other four disks. In this way, the contents of any one failed disk can be reconstructed from the non-failed disks, but the cost in terms of overall capacity is much smaller as compared to RAID-1 systems.

RAID-5 is similar to RAID-4 but instead of a single disk being dedicated to parity, the data and parity stripes are distributed across all the disks to improve read performance. A set of data and parity/syndrome blocks across some or all of the disks is known as a "stripe", as will be addressed in greater detail below. RAID-6 is another variant which can allow for two disk failures by storing both P and Q blocks.

With RAID 4, 5, and 6 formats, when one data block of a stripe is modified the parity blocks must be updated accordingly. The RAID implementation must read the unchanged data blocks, recalculate the contents of the P and Q blocks, and then write the changed data block and the P and Q blocks to their respective disks. These actions occur at the direction of the RAID hardware or software.

The file system for a computer system that includes the RAID memory devices is unaware of the details of how the RAID hardware and/or software handles storage matters. "File system" as used herein concerns the overall mechanisms and structures with which files or information are named, stored, and organized. A file system may consist of files, directories, databases, and the code needed to locate and/or access these items. For example, file system can refer to a portion of code, such as an operating system, that translates requests for file operations from an application program into low-level, sector-oriented tasks that can be understood by the drivers controlling the disk drives.

A problem may occur when new data is written and, afterwards, an update to the parity information is saved. A problem may also occur when parity information is saved and, afterwards, an update to the new data is written. In either sequence of events there is a point in time at which a system crash and disk failure could cause incorrect data to be recovered from the parity information. Taking the first sequence of events for example, when updating a data block on a disk there is a short period of time after writing the new data, but before writing the new parity information, during which the RAID array is in an inconsistent state. A crash while this inconsistent state is present, if followed by a disk failure, may lead to data loss or corruption. This problem, known as the "write hole", is one of the shortcomings of RAID formats.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth. However, it is understood that embodiments of the invention may be practiced without these specific details. Well-known circuits, structures and techniques have not been shown in detail to avoid obscuring an understanding of this description. References to "one embodiment", "an embodiment", "example embodiment", "various embodiments" and the like indicate the embodiment(s) so described may include particular features, structures, or characteristics, but not every embodiment necessarily includes the particular features, structures, or characteristics. Further, some embodiments may have some, all, or none of the features described for other embodiments. Also, as used herein "first", "second", "third" describe a common object and indicate that different instances of like objects are being referred to. Such adjectives are not intended to imply the objects so described must be in a given sequence, either temporally, spatially, in ranking, or in any other manner.

Various embodiments of the invention address data storage issues (e.g., the "write hole" issue) present with, for example, RAID formats such as RAID-5 and RAID-6 systems. However, embodiments of the invention are not limited to any one specific RAID format or even to RAID architecture.

RAID is conventionally implemented at the "disk" level. A hardware RAID controller will present itself to the file system as if it were a single disk, and all the handling of parity information may be performed transparently, including the "write hole" as previously mentioned. Software RAID implementations also present themselves as a standard block device and file systems use the SW RAID system without knowledge of what is going on at the lower levels.

Some embodiments of the invention may shift the responsibility for creating parity blocks from the RAID hardware or software units or modules to the computer system's file system (e.g., B-tree file system (btrfs)), allowing the file system's existing mechanisms of write atomicity to be used to help ensure consistency of the on-disk information throughout all or increasing portions of the information saving and/or updating cycle. An atomic update operation is, for example, a sequence of uninterruptible operations or instructions to update a memory location.

Figure 1:
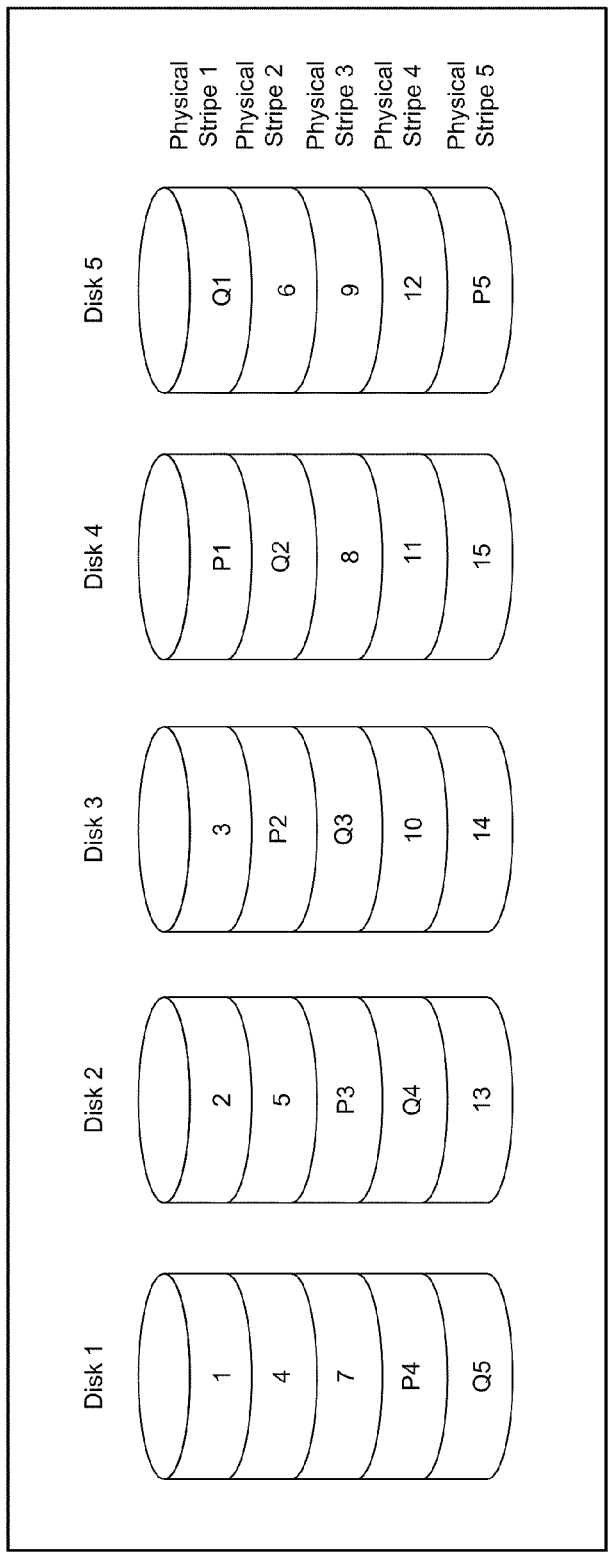
FIG. 1 illustrates a conventional RAID system.

FIG. 1 illustrates a conventional RAID-6 layout in which two disks out of each physical stripe are dedicated to redundant information in order to recover from two disk failures. A "physical stripe" in conventional RAID systems comprises data and parity blocks that are included in equivalently located regions of several different disks or other storage media. For example, in physical Stripe 1 the 'P1' and 'Q1' blocks contain error correction data (i.e., parity data) corresponding to data blocks 1, 2, and 3. In physical Stripe 2 the 'P2' and 'Q2' blocks contain error correction data corresponding to data blocks 4, 5, and 6. This format carries on for the remaining physical stripes in FIG. 1. Data block 1 is not in the same physical stripe as data block 4 but is in the same physical stripe as data block 2.

Referring to physical Stripe 1 for explanation purposes, with conventional RAID systems if the file system modifies the contents of only block 2, then blocks 1 and 3 must nevertheless be read from their respective disks. Also, the P1 and Q1 blocks must be rewritten and the new data for block 2 must be written. This is the read/modify/write cycle during which the "write hole" occurs. In the traditional RAID usage model, the file system is not aware of the details of the underlying RAID implementation and merely treats the data blocks as it would a simple single disk.

Figure 2:
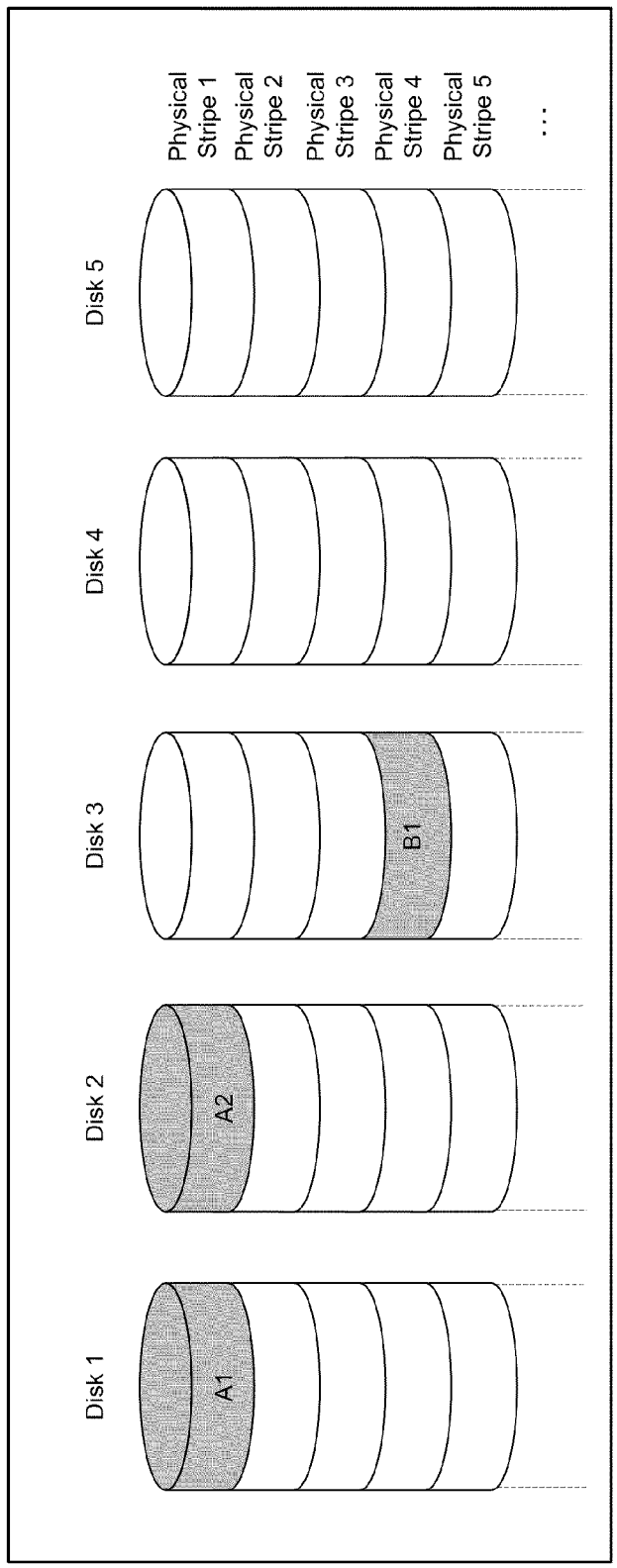
FIGS. 2-5 include various embodiments of the invention that concern a storage system.

FIG. 2 includes a file storage system in one embodiment of the invention. The system includes data blocks A1, A2, both belonging to file "A", and block B1 belonging to file "B". The file system may follow its normal allocation strategies to lay out the data blocks in an optimal fashion in order to, for example, avoid later disk fragmentation. In FIG. 2 the writes have not yet been "committed" by a synchronization ("sync") system call or similar method. Thus, it is still acceptable for these writes to be "lost" in the event of a crash.

Figure 3:
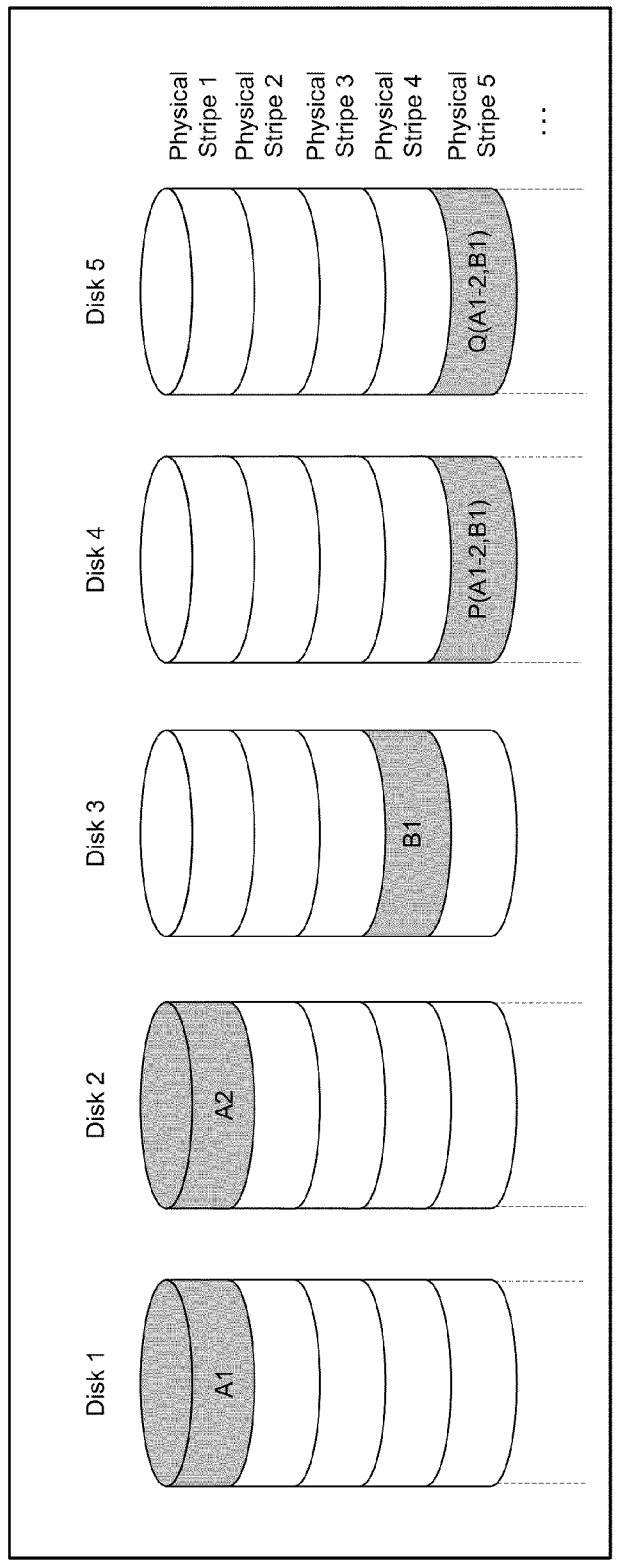

In FIG. 3 the writes from FIG. 2 have been "committed" so, in one embodiment of the invention, that parity blocks P, Q may also be written to disk in order to protect against a disk failure. The file system may have been free to allocate any free blocks to hold the redundant data. For example, note parity blocks P(A1-2,B1), Q(A1-2,B1) are on or in a different physical stripe from any of blocks A1, A2, B1 to which they relate. However, blocks A1, A2, B1, P(A1-2,B1), and Q(A1-2,B1) are located in the same "logical stripe." A logical stripe may be the equivalent of a physical stripe in instances such as FIG. 1, but is not so limited and may generally include blocks logically interrelated (e.g., blocks that share parity data) that are not included in the same physical stripe.

Figure 4:
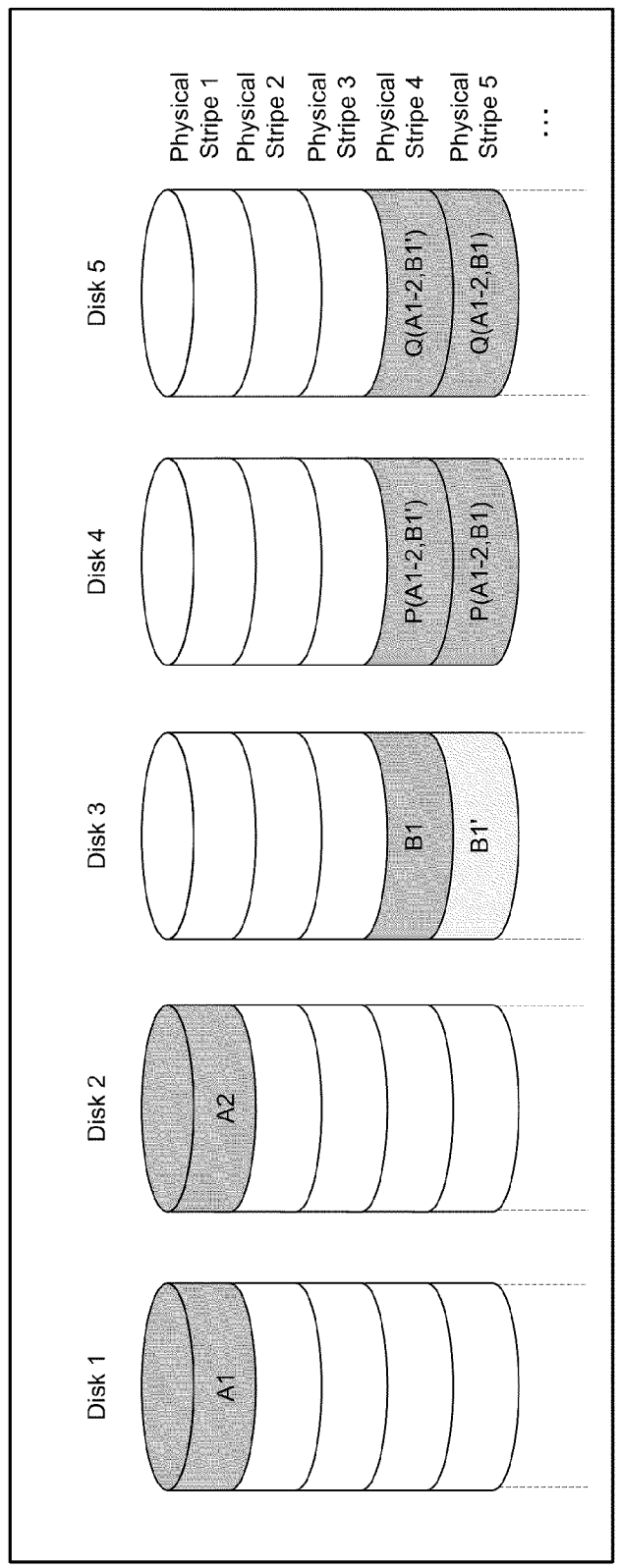

In FIG. 4 file "B", which includes block B1, has been overwritten. The file system may write out a new data block (B1') elsewhere from previous block (B1). However, embodiments of the invention are not limited in this regard and may overwrite data in place. Returning to FIG. 4, the file system writes a new set of redundant data blocks, P(A1-2, B') and Q(A1-2, B') again grouping data from file B with the two data blocks from file "A". Note the flexibility afforded by using the file system which results in storing B', P(A1-2, B'), and Q(A1-2, B') in different physical stripes according to the file storage process of the file system.

Figure 5:
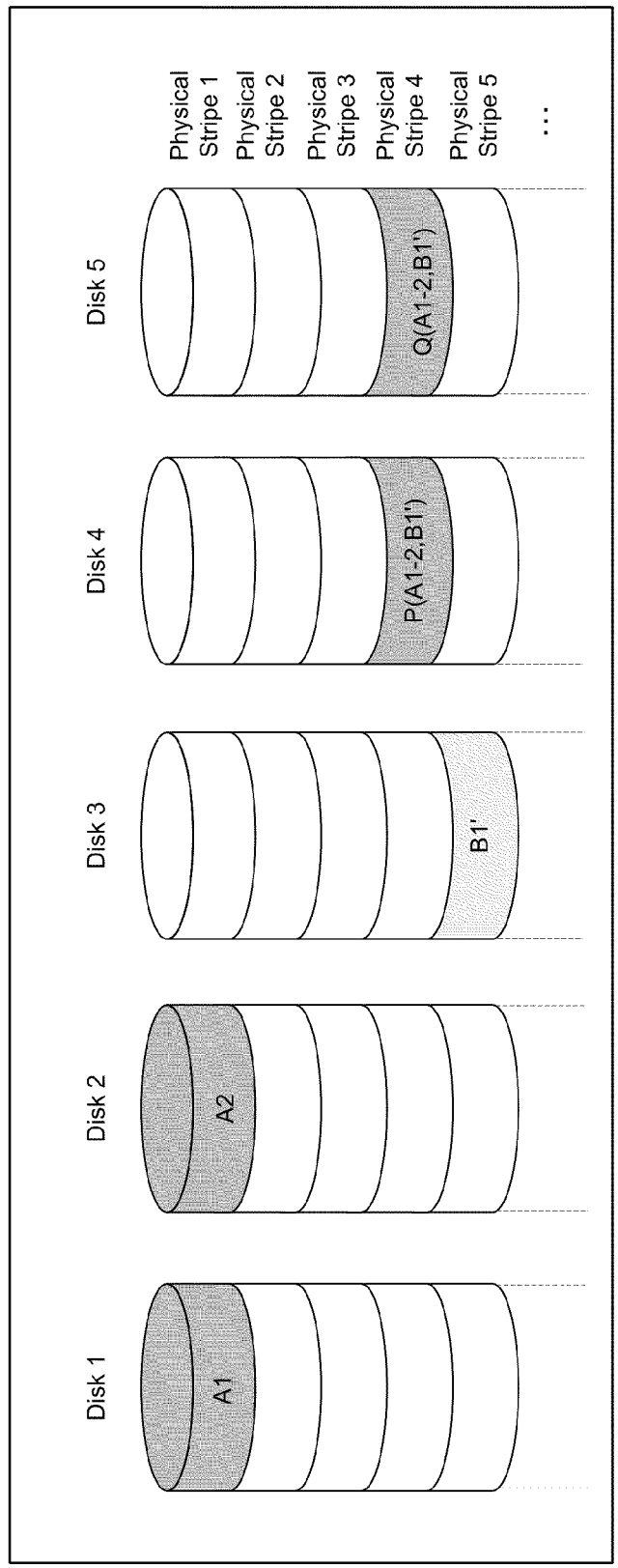

FIG. 5 demonstrates the state of the file system after the file "B" original data block B1 has been freed and returned to the free pool, along with the original parity blocks P(A1-2, B) and Q(A1-2, B). The file "A" blocks A1, A2 are protected by new parity blocks P(A1-2, B') and Q(A1-2, B') and at no time, or substantially little time, were A1, A2 in danger of being lost due to, for example, the atomic nature of the update, controlled by the file system's own innate transaction handling. For example, because P(A1-2, B), Q(A1-2, B), P(A1-2, B'), and Q(A1-2, B') are all maintained or stored in the system disks at one point in time (e.g., see FIG. 4), an atomic action (e.g., changing a pointer from the first parity data to the second parity data) may be performed and thus, A1, A2, and B1' are not in danger, or are in limited danger, of being lost or compromised.

While FIG. 5 includes P and Q blocks in the same physical stripe, embodiments of the invention may locate P and Q in different physical stripes. Furthermore, FIG. 5 shows all five disks employed in the logical stripe that includes A1-2, B', P(A1-2, B'), and Q(A1-2, B'). However, in some embodiments every disk need not be so used. For example, consider:

| X | X | X | x | Y |
|---|---|---|---|---|
| Y | Y | y | Z | Z |
| Z | z | W | W | w |
| V | V | V | v | v |
| U | U | U | U | U | where "XXXx", "YYYy", and "ZZZz" each represent organization schemes including three data blocks related to one parity block in a five disk system. "WWw" represents an organization scheme with two data blocks related to one parity block. "VVVvv" represents a highly redundant scheme with three data blocks related or corresponding with two parity blocks than can manage two disk failures. "UUUUU" has no redundancy. Further still, embodiments of the invention include the following:

| U | z | V | U | v |
|---|---|---|---|---|
| Z | V | W | W | z |
| Y | X | y | Z | U |
| X | U | X | v | w |
| V | Y | U | x | Y | where "XXXx", "YYYy", and "ZZZz" still represent organization schemes including three data blocks related to one parity block. However, the above table more clearly shows how the (i) schemes are not required to utilize every disk in the system, and (ii) the schemes allow for logical stripes that do not coincide with physical stripes. For example, the "XXXx" logical stripe extends across three different physical stripes. Also, to promote data security embodiments of the invention may ensure two members of the same logical stripe are not located on a single disk. This protective mechanism may be disabled for information that is not to be protected with redundant data (e.g., low value interne files).

In one embodiment of the invention a file system may rely on its method of allocating blocks for storage whereby it tracks which blocks are free and which blocks are unavailable. In some embodiments the file system may track which P and Q blocks correspond to which sets of data. For example, the file system may keep this tracking information at the "block storage" level, where data blocks from arbitrary objects (e.g., directories, different files) can be grouped together into a logical stripe (or physical stripe) for parity generation without heed to which higher-level objects they belong to. Some embodiments may include a data structure on the storage medium to keep track of which blocks are grouped together. Some embodiments of the invention may group blocks into logical stripes (or physical stripes) only when they belong to the same file system object (e.g., the same directory, the same file, and the like). Grouping information may be stored in metadata for the object.

Also, with conventional RAID systems there is little need to track parity block location because such blocks are stored in the same physical stripe as their respective data blocks. Various embodiments of the invention, however, include an extra data structure that maintains details about where parity blocks are that do not reside in the same physical stripes as their related data blocks. Such data may not be necessary for parity blocks that do reside in the same physical stripes as their related data blocks.

Thus, in one embodiment of the invention the conventional model of RAID hardware and/or software controlling storage is changed. Some embodiments do so by shifting responsibility for the redundant data blocks (e.g., P and Q blocks) to the file system's block allocator. Also, with conventional RAID systems the file system merely issues a write request to a given "logical" block number on the "disk". Then the lower layers of the RAID system allocate the write with a fixed layout of parity blocks. This is done using the read/modify/write cycle that leads to the "write hole" problem. However, some embodiments of the invention allow the file system to allocate the write by giving the file system full control, or substantially full control, for the layout of the blocks.

In one embodiment of the invention a file system has the ability to allocate individual blocks for various purposes, and it can group arbitrary data blocks together into logical stripes for the purposes of storing redundant parity information. In an embodiment of the invention, when the file system desires to overwrite a subset of the blocks in a physical or logical stripe the file system can regroup the data blocks and write new P and Q blocks to a new location as well as change the data. Thus, the file system may commit a single atomic change to a storage table (e.g., change a pointer value) or the like which describes the logical stripe. In an embodiment the file system can also free the old P and Q blocks. By using embodiments of this method, there is no or little time during which the parity information would be incorrect.

In addition, some embodiments of the invention implement redundancy that is not necessarily required to happen at the time of each individual data write to the disk. For example, some file systems are transactional and data are not guaranteed to be permanently resident on the medium until sometime after they are originally written. A "sync" system call or similar instruction may be used to actually write the data to the medium. By allowing the file system to take responsibility for the parity storage, the file system can group multiple small file writes into a logical stripe (or physical stripe) for the purposes of parity generation. In some embodiments of the invention, this grouping happens at the time that the file system "commits" its changes allowing significant improvements in efficiency of smaller writes.

Also, in some embodiments of the invention a "RAID rebuild" occurring after a disk replacement can be significantly more efficient than is the case with conventional RAID systems. Conventional RAID systems may need to check consistency of all the parity or mirror information in physical stripes after a crash, regardless of whether each set of blocks was being written at the time or whether each set of blocks was even in use at all by the file system. In some embodiments of the invention that allow the RAID setup to be managed by the file system, however, only those logical stripes which were being modified at the time of the crash may possibly call for attention because, for example, the file system may have knowledge of which data, if any, was in use or being written at the time of the crash.

Thus, various embodiments of the invention achieve data storage advances over conventional storage techniques due to, for example, the file system having full or partial knowledge of the redundant data locations. Also, benefits are gained in some embodiments due to the ability to use arbitrary locations for the redundant data under the control of the file system. In addition, the ability to defer parity generation until possibly called for by transactional guarantees, rather than having to generate the redundant data for each low-level write to the disk, provides benefits as well. For example, this delay may give the ability to safely group smaller writes together for the purposes of parity generation and storage. Also, the ability to transactionally assign new parity blocks for existing data helps avoid the "write hole" problem. For example, some embodiments of the invention avoid the "write hole" problem by assigning new parity blocks for existing data before overwriting old parity blocks. Also, in a single atomic transaction a record or records (e.g., file allocation records or tables) can be updated to indicate newly written data blocks are now covered by new parity blocks. Afterwards the old parity blocks may be overwritten.

Embodiments of the invention may offer the ability to use different amounts of redundancy according to the requirements of the data. For example, fundamentally important file system metadata may have two redundant data blocks as with RAID-6, or potentially even more. In contrast, less important temporary files may have fewer or even no redundancy of storage. All this can be managed within the file system's allocation mechanisms, without having to allot separate "regions" for each type of storage. For example, a file in the user's "Internet Cache" directory might be replaceable. Accordingly, the file system may not use redundancy for the file. However, a file in the user's "Documents" directory may be more important. Thus, the file system may use "RAID6" to secure that file using P and Q parity blocks. In other words, various embodiments of the invention may allow blocks to be managed as a group rather than being divided into a special type of storage that is limited to storing certain types of information (e.g., data). For example, four blocks spread across four disks may be used to store low value Internet files with no redundancy. However, those same four blocks spread across four disks may then be reconfigured, via the file system, to store high value files with redundancy. Any of the four blocks may be used for data and coupled to other blocks that store parity information. However, any of the four blocks themselves may store parity data.

Figure 6:
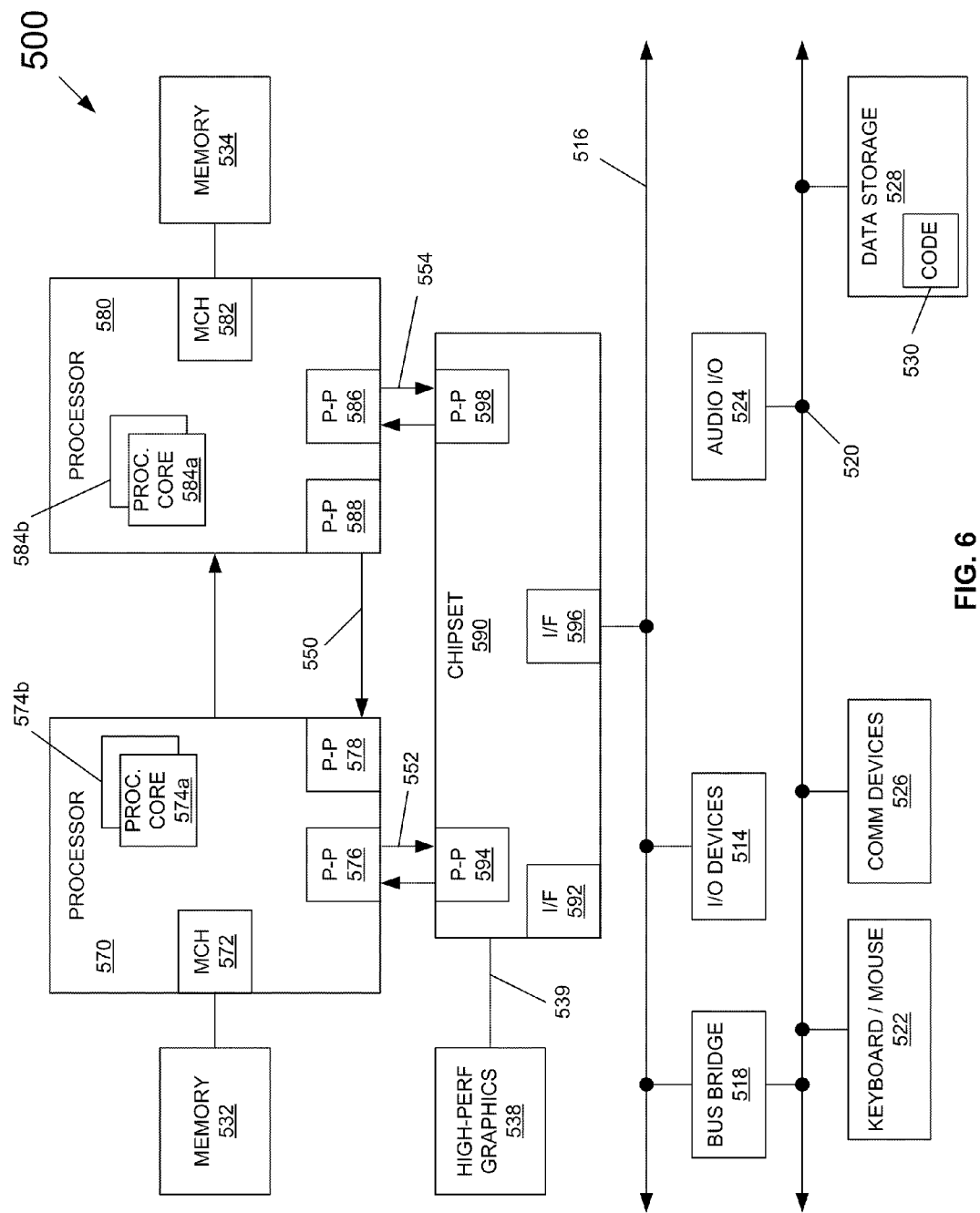
FIG. 6 includes a system block diagram for use with an embodiment of the invention.

Embodiments may be implemented in many different system types. Referring now to FIG. 6, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors, including first and second processor cores (i.e., processor cores 574a and 574b and processor cores 584a and 584b), although potentially many more cores may be present in the processors. The term "processor" may refer to any device or portion of a device that processes electronic data from registers and/or memory to transform that electronic data into other electronic data that may be stored in registers and/or memory.

First processor 570 further includes a memory controller hub (MCH) 572 and point-to-point (P-P) interfaces 576 and 578. Similarly, second processor 580 includes a MCH 582 and P-P interfaces 586 and 588. MCHs 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. Chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. Various input/output (I/O) devices 514 may be coupled to first bus 516, along with a bus bridge 518, which couples first bus 516 to a second bus 520. An audio I/O 524 may be coupled to second bus 520. Various devices may be coupled to second bus 520 including, for example, a keyboard/mouse 522, communication devices 526.

Data storage unit 528, such as a disk drive or other mass storage device such as a RAID system, may also be coupled to bus 520. Unit 528 may include code 530 or other data or instructions. Although the discussion herein has focused at times on disk-based file systems, embodiments of the invention may be used with other storage media. For example, stripes may extend across an array of flash memory. Also, stripes may extend across regions of a single flash memory. Other examples of suitable media include native file systems operating directly on raw NOR or NAND flash media, as well as the "translation layers" which may be implemented in Solid State Disks (SSD) utilizing the same underlying flash technology. Embodiments of the invention may also be applicable to semiconductor devices such as read-only memories (ROMs), random access memories (RAMs) such as dynamic random access memories (DRAMs), static random access memories (SRAMs), erasable programmable read-only memories (EPROMs), electrically erasable programmable read-only memories (EEPROMs), magnetic or optical cards, or any other type of media suitable for storing electronic instructions or information. Regarding RAM storage, if certain read-only parts of a system RAM are considered critical, parity blocks may be allocated at arbitrary locations in order to facilitate recovery from RAM errors which may be signaled as a (normally unrecoverable) machine check or similar method. Other memory or storage mediums include, but are not limited to, any type of disk including floppy disks, optical disks, compact disk read-only memories (CD-ROMs), compact disk rewritables (CD-RWs), and magneto-optical disks. "Disk" is not limited to rotatable hard disk drives and includes disks (e.g., SSD, flash memory, and the like) and media mentioned herein.

While various file systems have been addressed herein for explanatory purposes, embodiments of the invention are not limited to any particular file system and may work with, without limitation, FAT (FAT12, FAT16, FAT32, exFAT), NTFS, HFS and HFS+, HPFS, UFS, ext2, ext3, ext4, btrfs, ISO 9660, ODS-5, Veritas File System, ZFS, UDF, YAFFS, NFS, GFS, GPFS, XFS, ReiserFS, and the like. Embodiments of the invention may operate with a Linux operating system but is not limited thereto and may operate with other systems.

Embodiments may be implemented in code and may be stored on a storage medium having stored thereon instructions which can be used to program a system to perform the instructions. The storage medium may include, but is not limited to, any type of disk including floppy disks, optical disks, optical disks, SSDs, CD-ROMs, CD-RWs, and magneto-optical disks, semiconductor devices such as ROMs, RAMs such as DRAMs, SRAMs, EPROMs, flash memories, EEPROMs, magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

While "file system" has been used herein to illustrate concepts of various embodiments of the invention, some embodiments of the invention do not necessarily use traditional file systems and the term file system as used herein is not necessarily limited to traditional file systems. Embodiments of the invention may generally use code, which may be deemed a file system, that, without limitation, directs information (e.g., data, files, data objects, and the like) allocation, tracking, writes, and/or reads, and the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    writing first data to a first data block and second data to a second data block;
    writing first parity information that corresponds to the first and second data;
    updating the first data with updated first data;
    writing second parity information, to third and fourth parity blocks, that corresponds to the first updated data and the second data;
    after finishing writing the second parity information, freeing the first parity information to be written over; and
    writing the updated first data to a fifth data block;
    wherein the first and second data blocks and third and fourth parity blocks are respectively included in separate disks and the first and fifth data blocks are located in different physical stripes.

2. The method of claim 1, wherein the first and second data blocks are included in different physical stripes.

3. The method of claim 1 including, after writing the second parity information, overwriting the first parity information, wherein the first parity information and the second parity information are included in different physical stripes.

4. The method of claim 1 including writing the second parity information to the third parity block, wherein the third parity block and the first data block are included in different physical stripes.

5. The method of claim 1, wherein the first parity data is resident in fifth and sixth parity blocks at the same time the second parity data is resident in the third and fourth parity blocks.

6. The method of claim 5 including atomically updating file system allocation information to reflect writing the second parity information to the third and fourth parity blocks based on the first parity data being resident in the fifth and sixth parity blocks at the same time the second parity data is resident in the third and fourth parity blocks.

7. The method of claim 1 including writing the updated first data without requiring the second data be read from the second data block.

8. The method of claim 1 including using file system code, and not Redundant Array of Inexpensive Disks (RAID) code, to finally determine the locations of the third and fourth parity blocks.

9. The method of claim 1 including performing a memory rebuild by only checking parity data for logical stripes that were being modified at the time of a failure that necessitated the rebuild.

10. An article comprising a non-transitory medium storing instructions that enable a processor based-system to:
- write first data to a first data block;
- write first parity information that corresponds to the first data;
- update the first data with updated first data;
- write second parity information to a second parity block that corresponds to the first updated data;
- maintain the first parity information in a third parity block and, at the same time, maintain the second parity data in the second parity block; and after finishing writing the second parity information, allow the first parity information to be written over;
- wherein the first data block and the second parity block are included in separate storage regions.

11. The article of claim 10 further storing instructions that enable the system to write the first and second parity information to different physical stripes.

12. The article of claim 10 further storing instructions that enable the system to write the second parity information and the first data block to different physical stripes.

13. The article of claim 10, wherein the separate storage regions are respectively included in first and second flash memories.

14. The article of claim 10 further storing instructions that enable the system to use file system code, and not Redundant Array of Inexpensive Disks (RAID) code, to finally determine the location of the second parity block.

15. The article of claim 10 further storing instructions that enable the system to atomically update file system allocation information based on the second parity information and the first parity information being simultaneously maintained in blocks.

16. An apparatus comprising:
- a processor, coupled to a memory, to:
  - (i) write first data to a first data block included in the memory;
  - (ii) write first parity information that corresponds to the first data;
  - (iii) update the first data with updated first data; and
  - (iv) write second parity information to a second parity block that corresponds to the first updated data;
- wherein the processor is to write the first and second parity information to different physical stripes.

17. The apparatus of claim 16 wherein the processor is to, after finishing writing the second parity information, free the first parity information to be written over.

18. The apparatus of claim 16, wherein the processor is to maintain the first parity information in a third parity block and, at the same time, maintain the second parity data in the second parity block.

19. The apparatus of claim 16, wherein the first data block and the second parity block are to be included in separate storage disks and separate physical stripes.

* * * * *